Jan. 30, 1962 F. E. TEPOLT ETAL 3,019,356
ELECTRONIC TIMER
Filed March 13, 1959
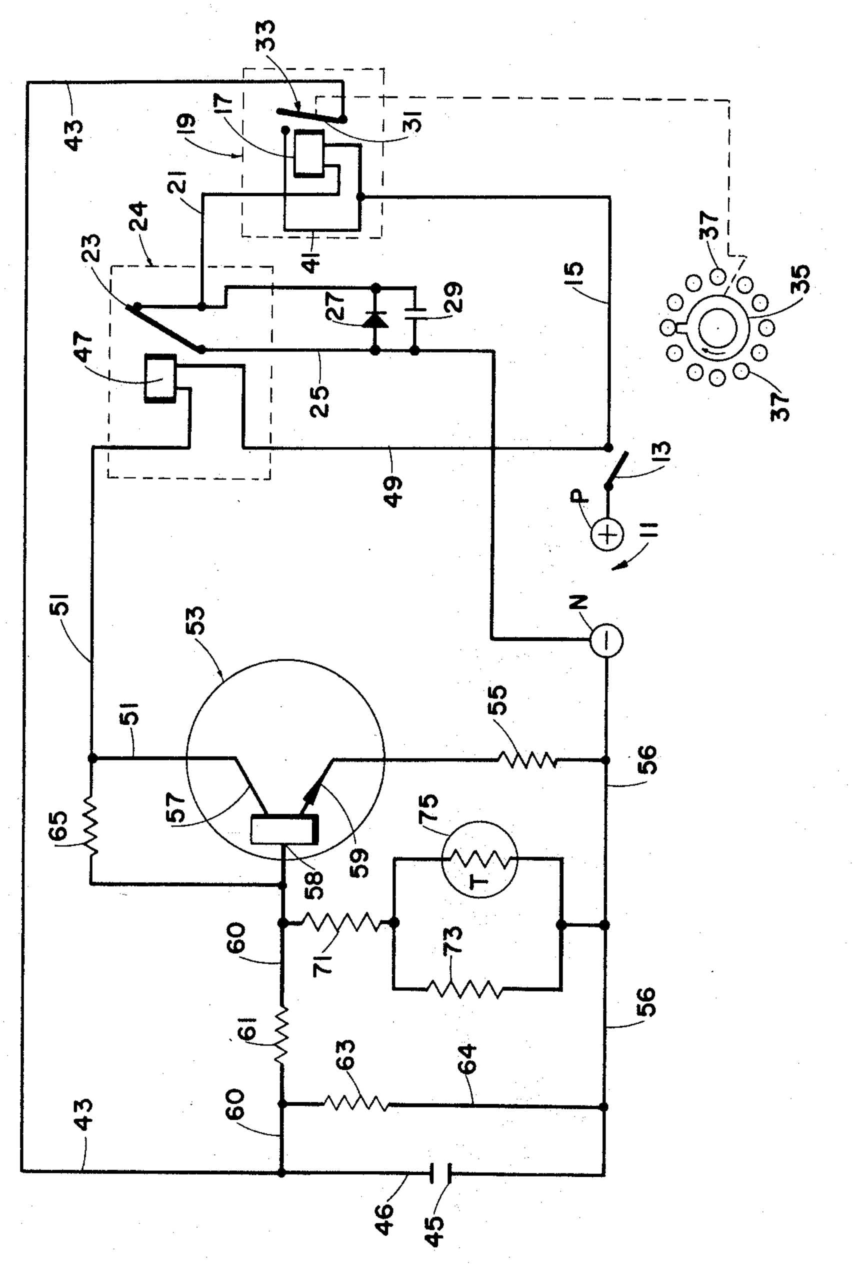
*INVENTORS*
FLORIAN E. TEPOLT
DONALD B. HEASLIP
BY Robert W. Ely
ATTORNEY

United States Patent Office 3,019,356

Patented Jan. 30, 1962

3,019,356

ELECTRONIC TIMER

Florian E. Tepolt, Utica, and Donald B. Heaslip, Sauquoit, N.Y., assignors to The Bendix Corporation, a corporation of Delaware Filed Mar. 13, 1959, Ser. No. 799,232
5 Claims. (Cl. 307—132)

This invention relates to electrical timing apparatus and more particularly to a cycling timer having a transistor control circuit.

An object of the present invention is to provide an improved timer in which a transistor circuit provides a predetermined time delay and which timer is more compact and lighterweight.

A further object is to provide such a timer having a capacitor-energized transistor circuit which has temperature compensating means.

Another object is to provide a cycling timer in which a capacitor-transistor circuit controls a relay which in turn actuates a stepper switch.

The realization of the above objects along with the features and advantages of the invention will be apparent from the following description and the accompanying drawing.

The drawing is a diagrammatic showing of an electrical timer embodying the invention and shows a stepper switch which is rotated after a predetermined time delay resulting from circuitry having a relay switch, a timing capacitor and a transistor.

Referring to the accompanying drawing, the battery or source 11 of 28-volt direct current having a first positive terminal P and a second negative terminal N is connected via control switch 13 and conductor 15 to actuator coil 17 of stepper switch 19. Stepper switch 19 is shown diagrammatically and is similar to the switch shown in U.S. Patent #2,803,814. Coil 17 is connected by conductor 21, normally-closed switch 23 of relay 24 and conductor 25 to the source 11. Arc suppression at switch 23 is provided by the rectifier 27 and capacitor 29 which are connected across the relay switch 23.

Stepper switch 19 includes a mechanical rotating connection (indicated by the dashed line) from the movable element 31 of a coil-actuated, normally-open interrupter switch 33 to the rotary contact 35 which is thus rotated to provide an electrical connection therefrom to the circularly-arranged contacts 37. Contacts 37 can be connected to solenoid valves (not shown) which control the inflation of de-icing boots on aircraft.

Stepper switch coil 17 when energized closes interrupter switch 33 and by conductor 41 connected to conductor 15 before coil 17 and conductor 43 provides a charging circuit for the timing capacitor 45 having conductor 46. Interrupter switch 33 will break this circuit when relay switch 23 is opened which occurs when the coil 47 of relay 24 is energized. The circuit to coil 47 is provided by conductor 49 from control switch 13 to the coil 47 and conductor 51 to transistor 53 which connects to the source 11 through resistor 55 and common bus 56.

The high gain silicon transistor 53 is of the NPN type having collector 57, base 58 and emitter 59 with collector 57 connected to relay coil 47 and emitter 59 connected to source 11. The base 58 is connected to line 43 by conductor 60 having input-limiting resistor 61. The circuit through closed interrupter switch 33 and resistor 61 thus makes transistor 53 conductive initially after capacitor 45 is charged. When the transistor is so conductive, relay coil 47 is energized and relay switch 23 is opened which opens the circuit to actuator coil 17 and thus permits the opening of interrupter switch 33 which interrupts the current from source 11 to the capacitor 45 and the base 58. A timing resistor 63 is connected by conductor 64 across capacitor 45. A feedback resistor 65 is connected to the lead to the transistor collector 57 and to the lead to the transistor base 58. This feedback circuit provides a small non-energizing current which stabilizes the cut-off point of the transistor.

A temperature compensating circuit is provided by a resistor 71 serially connected to a resistor 73 and a thermistor 75 in parallel. This circuit is connected to conductor 60 between limiting resistor 61 and base 58 and to the common bus 56. The thermistor 75 is a resistor having a high negative temperature coefficient (NTC) of resistance so that, for example, as temperature increases resistance decreases. Temperature effects on the capacitor and transistor are thus offset insofar as the altered characteristics of the capacitor and transistor would affect the collector-emitter current. The NTC resistor or thermistor 75 provides a reverse bias which varies with temperature to compensate transistor 53 and capacitor 45. Thus, with an ambient temperature increase, the NTC resistor 75 provides sufficiently less resistance so that the time delay before relay coil 47 is de-energized remains constant with a temperature increase.

In operation, when the control switch 13 is closed, the actuator coil 17 is energized, closing interrupter switch 31 and rotating the step contactor 35 of stepper switch 19. With switch 31 closed, a circuit for charging the timing capacitor 45 and for turning on the transistor 53 is provided. With transistor 53 conductive by current passing from base 58 to emitter 59, relay coil 47 is energized which causes relay switch 23 to open. The opening of switch 23 breaks the circuit to actuator coil 17 which de-energizes and permits interrupter switch 33 to reopen and to interrupt the circuit to the capacitor 45 and transistor base 58. At this stage, the transistor 53 remains conducting and hence relay coil 47 remains energized. The transistor 53 remains conductive because the capacitor 45 is discharging. The timing capacitor 45 discharges at a controlled rate through the timing resistor 63 and the transistor 53 from base 58 to emitter 59. As the charge decreases, the current from the capacitor through the transistor decreases and causes an increase in resistance from the collector 57 to the emitter which results in a decrease in the energizing current through the relay coil 47. The energizing current will continue to drop until, at some charge on the timing capacitor 45, the relay 24 will drop out and terminate the cycle. Thus, there is a predetermined time before the relay switch 23 closes to energize actuator coil 17 and to cause actuation of stepper switch 19. In this manner, the next cycle is initiated automatically after a predetermined time. As the transistor 53 and timing capacitor 45 change characteristics with changes in the ambient temperature, the NTC resistor 75 automatically varies the by-pass or bias current to maintain the collector current flow so that the predetermined time delay results.

In satisfactory tests of the cycling timer for giving a time interval of four seconds, the values of components were as follows:

| | |
|---|---|
| Coil **17** | 13 ohms. |
| Coil **47** | 2500 ohms. |
| Transistor **53** | Transitron 2N542. |
| Resistor **61** | 120,000 ohms. |
| Resistor **65** | 3 megohms. |
| Resistor **63** | 27,000 ohms. |
| Capacitor **45** | 68 microfarads. |
| Resistor **71** | 2.2 megohms. |
| Resistor **73** | 1 megohm. |
| Thermistor **75** | 100,000 ohms. |
| Resistor **55** | 510 ohms. |

It is apparent that components with other values can be submitted. For larger time delays (for example, thirty seconds), the value of resistor can be conveniently changed.

It is to be understood that persons skilled in the art can make changes in the disclosed embodiment without departing from the invention as set forth in the appended claims.

What is claimed is:

1. An electrical cycling timer comprised of transistor having a base, a collector and an emitter, a source of direct current having first and second terminals, a first circuit including a relay coil connecting said first terminal to said collector, a second circuit including a normally-open interrupter switch and an input-limiting resistor connecting said first terminal to said base, a third circuit including an actuator coil and a normally-closed relay switch connecting said first terminal to said second terminal, said relay coil being arranged to open said relay switch when said relay coil is energized, said actuator coil when energized being arranged to close said interrupter switch, said emitter being connected to said second terminal, a fourth circuit including a capacitor and a timing resistor in parallel connecting said second circuit between said interrupter switch and said input-limiting resistor to said second terminal, said circuits being arranged so that, when said interrupter switch is closed, said capacitor is charged, said transistor is made conductive, and said relay switch is opened by energizing said relay coil and further so that said transistor remains conductive due to said capacitor and said timing resistor and said relay coil remains energized for a predetermined time after said interrupter switch is opened.

2. An electrical cycling timer comprised of transistor having a base, a collector and an emitter, a source of direct current having first and second terminals, a first circuit including a relay coil connecting said first terminal to said collector, a second circuit including a normally-open interrupter switch and limiting resistor connecting said first terminal to said base, a stepper switch having an actuator coil, a third circuit including said actuator coil and a normally-closed relay switch connecting said first terminal to said second terminal, said relay coil being arranged to open said relay switch when said relay coil is energized, said actuator coil when energized being arranged to close said interrupter switch, said emitter being connected to said second terminal, a fourth circuit including a capacitor and a timing resistor in parallel connecting said second circuit between said interrupter switch and said limiting resistor to said second terminal, a temperature compensating circuit connected between said transistor base and said second terminal to said source, said circuits being arranged so that, when said interrupter switch is closed, said capacitor is charged, said transistor is made conductive, and said relay switch is opened by energizing said relay coil and further so that said transistor remains conductive due to said capacitor and said timing resistor and said relay coil remains energized for a predetermined time after said interrupter switch is opened.

3. An electrical cycling timer for giving a predetermined time interval comprised of a source of direct current; a transistor having a base, a collector and an emitter; a first circuit connected to said source and including a normally-open interrupter switch and an input-limiting resistor connected to said base; a common bus connected to said source; said emitter connected to said bus, a timing circuit including a capacitor and a timing resistor in parallel connected to said bus and to said first circuit between said interrupter switch and said input-limiting resistor; a stepper switch having an actuator coil; a second circuit including said actuator coil and a normally-closed relay switch connected to said source; said actuator coil being arranged when energized to move said stepper switch and to close said interrupter switch whereby said capacitor will be charged and said transistor will be made initially conductive; a relay coil connected to said source and said collector and arranged to open said relay switch when energized whereby said actuator coil is de-energized and hence said interrupter switch opens; a temperature compensating circuit connected from said base to said bus and arranged to offset the temperature effects on said transistor and said capacitor; said temperature compensating circuit including a resistor having a negative temperature coefficient; said capacitor being such that said transistor is maintained conductive so that said relay coil remains energized for a predetermined time interval whereby the closing of said relay switch and the movement of said stepper switch occur after the predetermined time interval.

4. An electric cycling timer comprised of a source of direct current, an actuator coil connected to said source and adapted to move a control device, a normally-open interrupter switch connected to said source and arranged to be closed by said actuator coil, a transistor having a base, collector and emitter, means including a limiting resistor connecting said interrupter switch to said transistor base whereby said transistor is made conductive when said interrupter switch is closed, timing means including a capacitor and resistor connected to said source and arranged to be charged when said actuator coil is energized and said interrupter switch is closed, a relay including a normally-closed relay switch and relay coil, means including said source and said relay switch for energizing said actuator coil, a first circuit including said source and said relay coil and said transistor arranged so that said relay coil is energized and hence said relay switch is opened when said transistor is made conductive whereby said actuator coil is de-energized and said interrupter switch is opened, said timing means being such as to make said transistor conductive so that said relay coil remains energized for a predetermined time, said relay switch remains open and said actuator coil is not energized until after said predetermined time when said relay switch returns to its normally-closed position to cause said interrupter switch to close to start another timing cycle for a control device.

5. The cycling timer according to claim 4 and being further characterized by a temperature compensating circuit including NTC resistor connected between said transistor base and said source, said circuit including a resistor in parallel with said NTC resistor and another resistor in series with said NTC resistor.

References Cited in the file of this patent

UNITED STATES PATENTS

| | | |
|---|---|---|
| 2,473,683 | Hines | June 21, 1949 |
| 2,828,450 | Pinckaers | Mar. 25, 1958 |

OTHER REFERENCES

Buckstein: "Radio and Television News," page 76, December 1954.